July 30, 1963  E. BAVERS  3,099,407
APPARATUS FOR STUFFING DOLLS, OR THE LIKE
Filed Jan. 31, 1961  4 Sheets-Sheet 1

INVENTOR.
ELLIOTT BAVERS
BY
ATTORNEY

July 30, 1963    E. BAVERS    3,099,407
APPARATUS FOR STUFFING DOLLS, OR THE LIKE
Filed Jan. 31, 1961    4 Sheets-Sheet 3
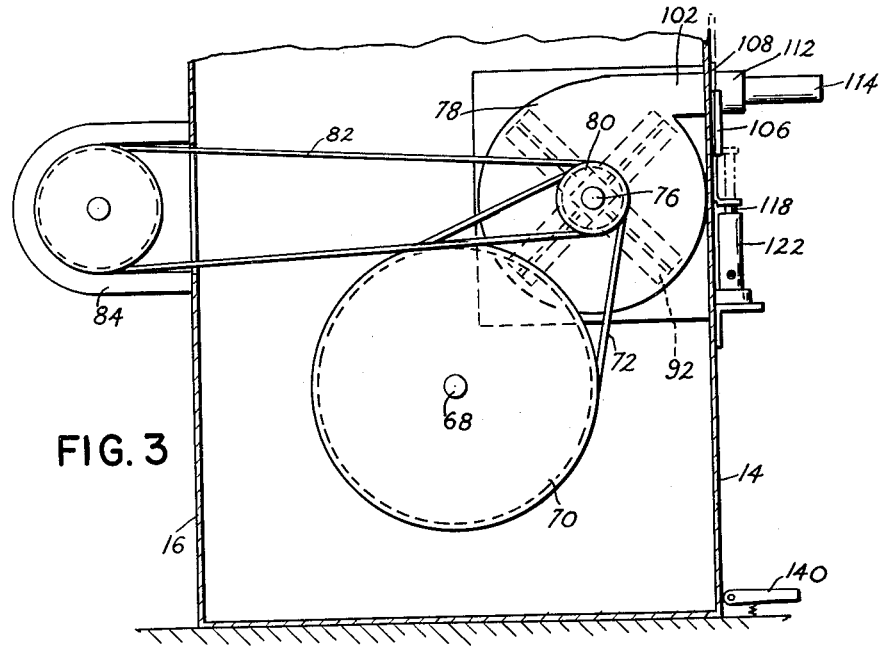
FIG. 3
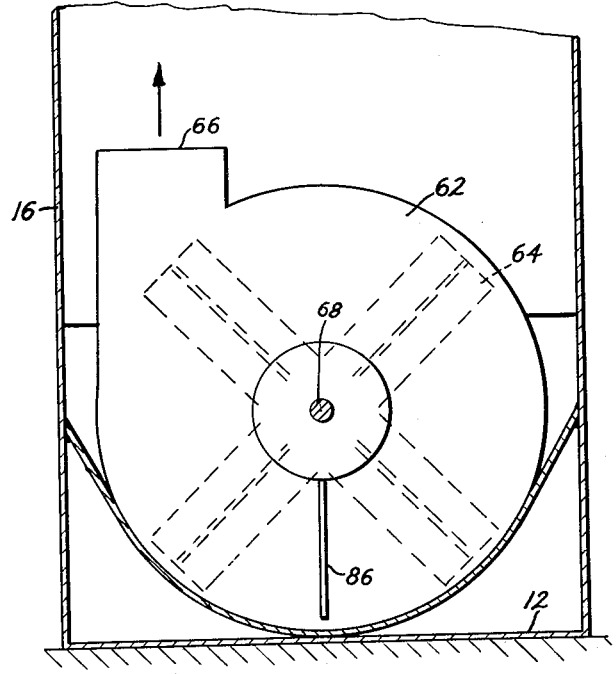
FIG. 4
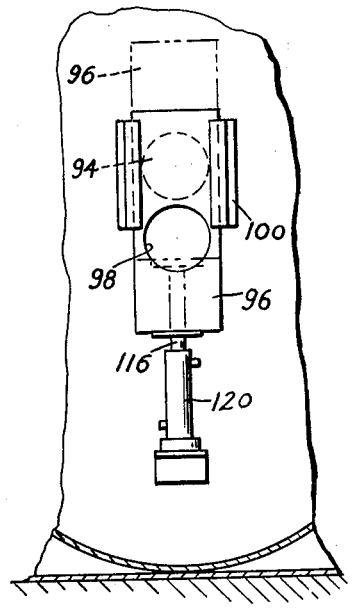
FIG. 5
INVENTOR.
ELLIOTT BAVERS
BY
ATTORNEY

INVENTOR.
ELLIOTT BAVERS

United States Patent Office 3,099,407
Patented July 30, 1963

3,099,407
APPARATUS FOR STUFFING DOLLS, OR THE LIKE
Elliott Bavers, Brooklyn, N.Y., assignor to Stuffing Equipment Corp., Brooklyn, N.Y., a corporation of New York
Filed Jan. 31, 1961, Ser. No. 86,089
11 Claims. (Cl. 241—47)

The present invention relates to apparatus for filling stuffed articles, such as dolls, or the like, and, particularly, electrically-operated stuffing apparatus of the type described.

In making stuffed dolls or the like, an outer pocket, or "skin," of appropriate shape to give the stuffed article the desired appearance is first formed, with an opening left in the skin through which the stuffing is inserted. Generally, the stuffing consists of some form of shredded material, such as shredded cotton clipping or shredded rag or fabric ends, which is fluffed up and mechanically blown into the skin, so as to give the stuffed article a uniformly springy body.

As the stuffing material generally comes in highly-compressed bales, it is necessary to thoroughly beat and break up or fluff the compressed material before it may be blown into the skin. Also, in order to provide uniform springiness for the stuffed body, it is essential that that the stuffing be thoroughly and uniformly fluffed, and blown into the body at a uniform rate and under uniform pressure.

Heretofore, great difficulties have been encountered in attaining uniform stuffing of the skins, since the blowers were operated at constant speed and the beaten and fluffed-up stuffing material was supplied to the blowers at a constant rate, so that when larger nozzles were used for stuffing larger skins, pressure supplied by the blowers of the stuffing apparatus was less than when nozzles of smaller diameter were used for the stuffing of smaller skins. Also, because the supply of shredded and fluffed stuffing to the blowers was constant, it was difficult, if not impossible, to vary the rate of stuffing. Further, because of the constant rate of feeding of material to the blowers, the outlet nozzles, when of small diameter, tended to become jammed, to bring about a need for stopping the apparatus.

Additionally, in the stuffing apparatus heretofore used, substantially all of the mechanism had to be stopped and de-activated whenever a pause in the operation, as for the replacement of a nozzle, or whenever the operator had to refill the supply bin of the apparatus, in order to avoid loss of material through the nozzle in the interval. Additional loss of material through the nozzle occurred during the interval of changing skins on the nozzle.

It is the general object of the present invention, therefore, to provide improved stuffing apparatus of the character described, in which all of the foregoing shortcomings are eliminated.

It is thus one object of the present invention to provide stuffing apparatus of the character described in which although the blowers may operate constantly, feeding of material to the blowers and from the blowers into a skin may be continued only during the period when a skin is in place to receive the stuffing material from the blowers, to thereby eliminate waste.

It is another object of the present invention to provide stuffing apparatus of the character described wherein the rate of feeding of the stuffing material to the blowers may be varied, to thereby make possible a variation in the compression of the stuffing material within a stuffed skin, and make possible fine adjustment in the stuffing compression.

It is still another object of the present invention to provide stuffing apparatus of the character described wherein the rate of supply of stuffing material to the blowers may be varied without affecting the speed of operation of the blowers or of the beaters.

It is a further object of the present invention to provide stuffing apparatus of the character described in which the flow of stuffing material therefrom may be discontinued at any time, as for removal and replacement of a skin for stuffing, and the feeding of material to and from the blowers simultaneously stopped, to thereby prevent a build-up of material supplied to the blowers while the outlet therefrom is shut off.

It is a still further object of the present invention to provide stuffing apparatus of the character described which are simple and easy to control and convenient and economical to use.

It is yet a further object of the present invention to provide stuffing apparatus of the character described which are of relatively simple construction, which are compact and occupy a minimum of space and are relatively economical to produce and install.

The foregoing and other objects and advantages of the stuffing apparatus of the present invention will become more readily apparent to those skilled in the art from the embodiment thereof shown in the accompanying drawings, and from the description following. It is to be understood, however, that such embodiment is shown by way of illustration only, to make the principles and practice of the invention more readily comprehensible, and without any intent of limiting the invention to the specific details therein shown.

In the drawings:

FIG. 3 is a fragmentary, enlarged section taken on line 3—3 of FIG. 1;

FIG. 4 is a fragmentary, enlarged section taken on line 4—4 of FIG. 2;

FIG. 5 is a fragmentary, enlarged section taken on line 5—5 of FIG. 1; and

Figure 1:
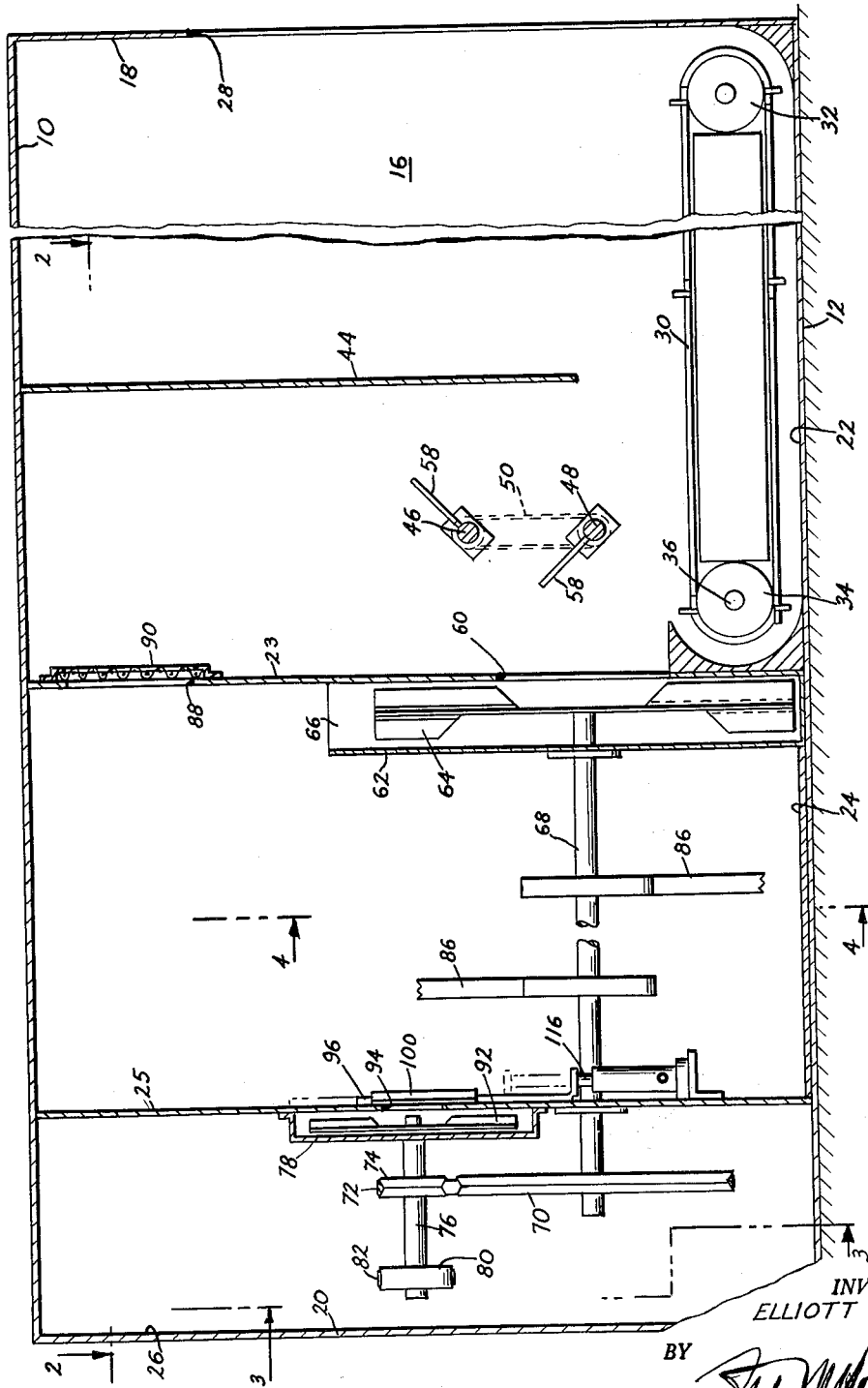
FIG. 1 is a more or less diagrammatic, foreshortened, vertical elevational view of one embodiment of the apparatus of the present invention, with a side wall thereof broken away to show interior structure and arrangement.
Figure 2:
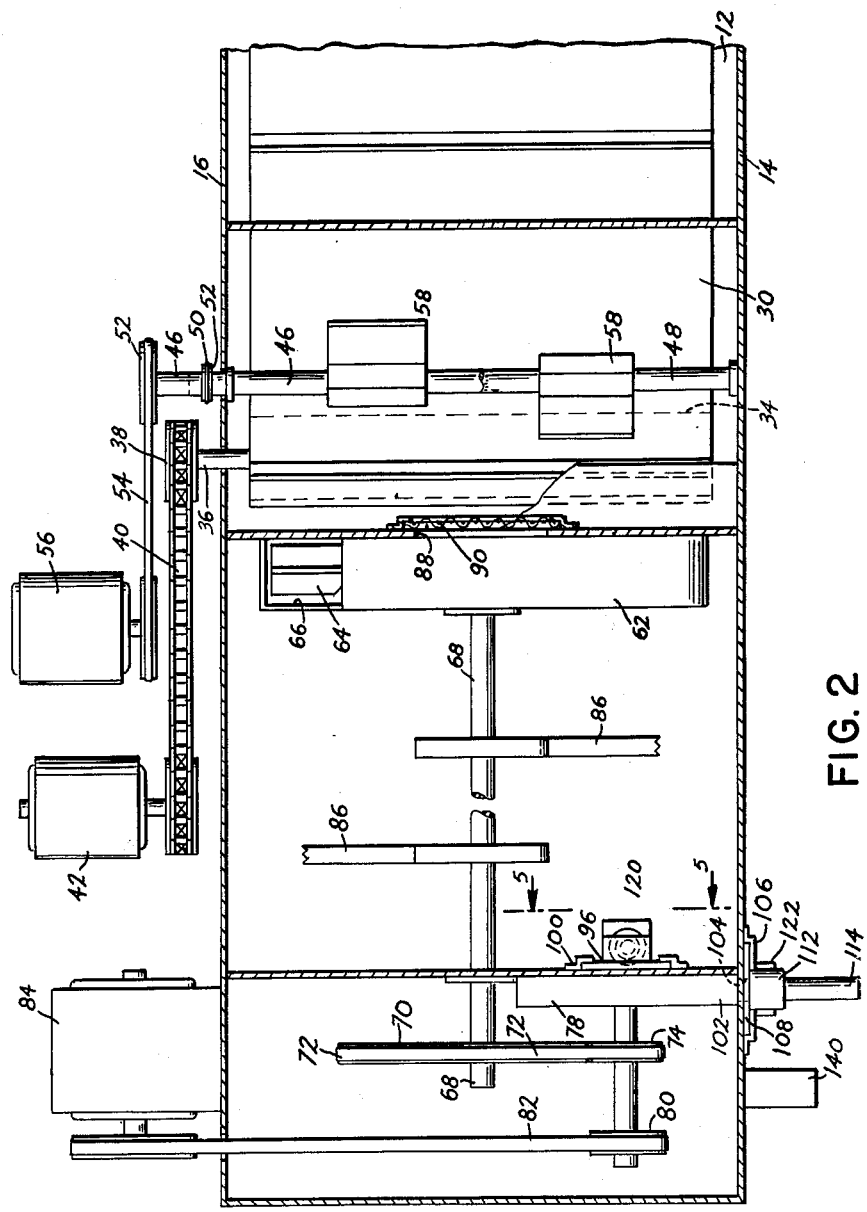
FIG. 2 is a horizontal section taken on line 2—2 of FIG. 1.

Generally stated, the present invention provides stuffing apparatus in which the several of its operations are actuated each by an individual motor, all connected in a common circuit, and certain of them separately controllable from the other, whereby certain of the operations of the apparatus may be stopped and started independently of the others.

More specifically stated, the apparatus of the present invention provides an arrangement whereby the feeding of material to and from the blowers may be controlled independently of the operation of the blowers and of the beaters, and the rate of feeding to the blowers likewise controlled independently, to thereby speed operation, attain control of output rate and volume at a constant, selectively variable rate, and minimize loss of operator's time and waste of material.

Referring now, in detail, to the embodiment of the invention illustrated in the drawings, the apparatus is shown to comprise a relatively large, fully-enclosed housing structure, preferably formed of sheet material and consisting of a top wall, 10, a bottom wall, 12, a front wall, 14, a rear wall, 16, and end walls, 18 and 20. The housing structure may be divided into at least two, and preferably three chambers, including a feeding or supply chamber 22, at one end of the apparatus, an intermediate beating or fluffing chamber, 24, separated from the supply chamber 22 by a partition, 23, and a third chamber, 26, at the other end of the apparatus, separated from chamber 24 by a partition, 25. The end wall 18, which is part of the supply chamber 22, is formed with a supply opening, 28, through which the compacted, baled, stuffing material is fed into the supply chamber.

Provided on the bottom of the supply chamber is an endless feeding belt, 30, extending the width of chamber 22, mounted over rollers, 32 and 34, parallel to partition 23, one of which, as 34, that is deposed adjacent partition 23, may be mounted on the drive shaft, 36, that extends to the exterior of the housing through the rear wall, 16 and carries, on its extension, a sprocket, 38, which connects by sprocket chain, 40, to the sprocket wheel on the shaft of electric motor, 42.

The chamber 22 may be partially divided into two compartments, by a baffle wall, 44, extending from its ceiling 10 parallel to partition 23 to a point short of the driving belt 30. Mounted within the inner compartment in the chamber 22 are a pair of vertically spaced shafts, 46 and 48, which extend to the exterior of the housing through the wall 16 and are interconnected exteriorly thereof by a driving belt, 50, engaging on suitable pulley wheels mounted on the shafts. One of the shafts, as the upper one, 46, may be the driving shaft which carries an additional pulley wheel, 52, connected by a driving belt, 54, to the pulley mounted on a second electric motor, 56. The shafts 46 and 48 mount beater rods or blades, 58, which are preferably directed in different directions. The partition, 23, separating the chamber 22 from chamber 24, is formed with an opening, 60, immediately above the endless belt 30, that opens into a blower casing, 62, built or disposed against the partition 23 within chamber 24 and housing the blower fan, 64; the casing 62 having an outlet opening, 66, at its top. The blower fan 64 is mounted on a shaft, 68, which may preferably be journalled in a wall of the fan housing 62 and into partition 25, and is normal to both of them. The shaft 68 extends into the chamber 26 where it supports a relatively large pulley wheel, 70, that is connected by a belt, 72, to a pulley, 74, mounted on another shaft, 76, that is supported within the chamber 26, as on the wall of a second blower casing, 78, secured against the partition 25, within chamber 26, and which carries a pulley wheel, 80, that is connected by belt, 82, to the pulley wheel on the shaft of a third electric motor, 84, on the exterior of the housing adjacent wall 16. The shaft 68 also mounts a number of oppositely-directed beaters, 86, within chamber 24, and the chamber 24 is provided with an air-escape opening, 88, formed in the partition 23 adjacent its top, that may be protected by a screen, 90.

The shaft 76 mounts the blower fan, 92, within the blower housing 78, and an inlet opening, 94, into the housing 78 from the chamber 24 is formed in partition 25. A movable closure is provided for the opening 94, preferably in the form of a plate, 96, having an opening, 98, preferably corresponding, in shape and size, to the opening 94. The closure plate 96 is supported for movement in and out of registering its opening 98 with the opening 94 in guideways, 100, secured to partition 25 adjacent the opening 94 within the compartment 24.

The housing 78 of the blower fan 92 is provided with a tubular outlet extension, 102, which connects with a corresponding opening, 104, formed in the wall 14. The wall 14 carries, preferably on its exterior, to each side of the opening 104, guideways, 106, in which is slidably guided a closure plate, 108, similar to the closure plate 96, formed with the opening, 110, preferably matching the opening 104. A cylinder, 112, may be supported on the wall 14 exteriorly of the closure plate 108 in register with opening 104 in which may be removably and interchangeably supported an outlet nozzle, 114.

Each of the closure plates 96 and 108 is connected for movement in and out of closing position to a piston, 116 and 118, respectively, of air cylinders, 120 and 122, respectively. The air cylinders 120 and 122 may be of any suitable type readily available for the purpose, either a two-port, reversible action cylinder or a springloaded cylinder which would normally maintain its piston in position to keep the attached closure plate in closing position. As the structure of any of these types of air cylinders and the manner of their operation is well known to those skilled in the art, and as numerous types of such cylinders are readily available in the market, they are only schematically illustrated in the drawings.

Figure 6:
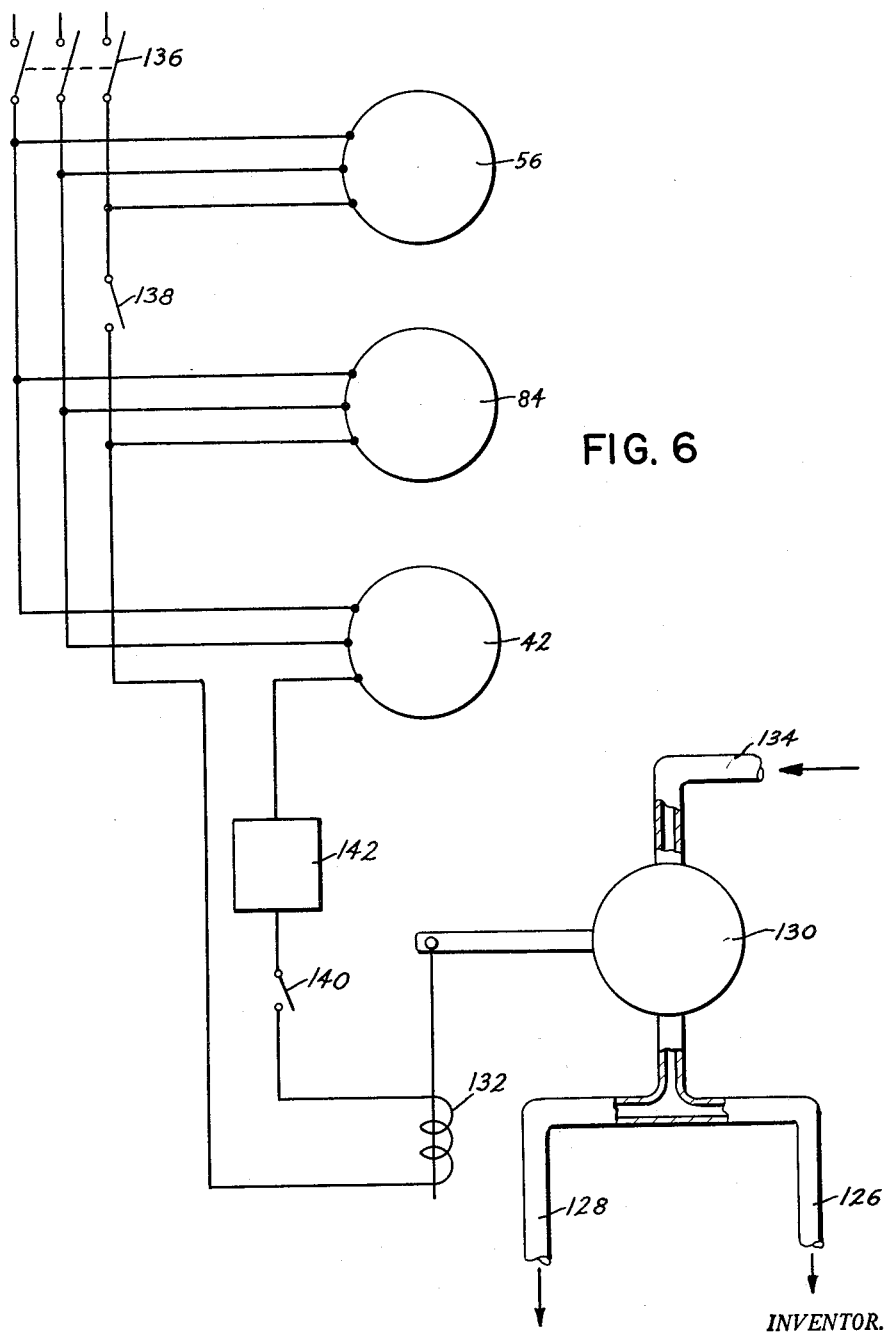
FIG. 6 is a schematic diagram of the electrical circuit and control through the apparatus of the invention.

The cylinders 120 and 122 are connected by suitable air conduits, as, 126 and 128, to an air valve, 130, controlled by a solenoid, 132, both schematically shown in FIG. 6 of the drawing. Such air valve may be of a two-way reversible type, where the cylinders are of a reversible type, or of a one-way type, where the cylinders are spring-loaded for automatic return. As such solenoid-controlled air valves are standard in the market and their operation is well known, they are not either shown or described in detail.

Each cylinder 120 and 122 may be connected to an individual air valve or both may be connected to a common air valve as illustrated, and such valve or valves connected, as by a conduit, 134, to a source of compressed air.

The motors 42, 56 and 84 may be connected to a common line controlled by a main switch, 136, which may, if desired, be mounted at any point on the exterior of the housing. The motors 42 and 84 are both controlled by a second switch, 138, which may be similarly mounted on the exterior of the housing, preferably adjacent the outlet opening 104, and the circuit of the motor 42 and of the solenoid 130 may be controlled by still a third switch, 140, preferably a pedal switch, at the base of the housing, approximately below the outlet opening 104.

Having thus described the essential features of the apparatus, its operation may now be described as follows. When the main switch 136 is closed, motor 56 is activated to turn the beaters 58 which continue in operation until such switch is opened. When the switch 138 is thereafter closed, it energizes motor 84 which operates the blowers 64 and 92 and beaters 86. When the pedal switch 140 is then pressed to close the circuit therethrough, motor 42 is energized to operate the endless belt 30 and simultaneously energizes the solenoid air valve 130 to move the closure plates 96 and 108 into open position. The energizing of motor 42 commences the feeding of baled material previously disposed in the outer compartment of chamber 22 to the beaters 58 already in operation. The material broken up by beaters 58 is sucked in through opening 60 by the blower fan 64 and discharged by it out of opening 66 into the compartment 24 where it is further broken up, separated and fluffed by the beaters 86 and sucked in through the opening 94 in the wall 25 and through the corresponding opening 98 in the closure plate 96, which has been set into open position by the closing of the pedal switch 140, to be sucked in by fan 92 and blown out through the blower housing extension 102, housing opening 104 and opening 110 of closure plate 96 into the nozzle 114 and into the skin mounted thereover.

It will be understood that at the initiation of operations, a priming period may have to elapse before the material from supply chamber 22 reaches the outlet nozzle 114. Thereafter, beaters 58, the blowers 64 and 92, and the beaters 86 will continue to operate as long as switches 136 and 138 remain closed. However, the feeding of material to and out of the blowers will be interrupted each time the pedal switch 140 is released to thereby stop motor 42 and thereby stop the feeding of material towards fan 64, and close plates 96 and 108 to inhibit movement of material out of chamber 24 and of housing 78. Such release of pedal switch 140 may be effected at any time when required to substitute an empty skin for a filled one on the nozzle 114 and also when required to refill the supply chamber 22. Feeding operation of the apparatus may be resumed at any time by the closing of the pedal switch 140, without any waste of time for repriming of the feeding circuit of the apparatus.

In order to provide for the feeding of proper amounts of material into the air circuit of the blowers, so that the rate of flow of material out of the nozzle 114 is directly proportional to the cross-section of the nozzle 114, means may be provided to vary the speed of motor 42, to thereby adjust the amount of material fed to the blowers and the supply of material available for discharge by the blowers. For that purpose, the motor 42 may be of variable speed and connected to a servo mechanism, 142, whose control, which may be of any conventional type, may be mounted on the front housing wall 14, in convenient location to the operator of the pedal switch 140.

This completes the description of the improved stuffing apparatus for dolls, or the like, of the present invention, and the manner of its operation. It will be apparent that such apparatus is highly effective for the purpose of forming stuffed articles of various sizes with stuffing of substantially uniform compactness and resilience. It will also be apparent that the apparatus of the invention may produce such stuffed articles with a minimum of waste of time and material. It will be additionally apparent that the apparatus of the invention is relatively simple and compact in its construction and relatively economical to produce and easy and convenient to operate.

It will be further apparent that numerous modifications and variations in the stuffing apparatus of the present invention may be made by anyone skilled in the art, in accordance with the principles of the invention hereinabove set forth, and without the exercise of any inventive ingenuity. I desire, therefore, to be protected for any and all such modifications and variations that may be made within the spirit of the present invention and scope of the claims hereto appended.

What I claim is:

1. Stuffing apparatus of the character described, comprising a housing including a chamber having front, rear, top and end walls, an inlet opening formed in a lower portion of one of said end walls, a blower adjacent said opening, said blower comprising a casing secured on the interior of said chamber over said opening, a rotary shaft extending through said casing and mounting a blower fan within said casing, said shaft journalled in the opposed end wall of said chamber and extending outwardly thereof, beaters mounted on said shaft within said chamber, an electric motor connected in an electric circuit, means operatively connecting said shaft to said electric motor, an opening formed in the opposed of said end walls, a blower disposed over said opening on the exterior of said end wall, said second blower including a casing secured to said wall, a rotary shaft extending through said casing and mounting a second blower fan, means operatively interconnecting said second shaft with said motor, an outlet opening in said second blower casing, a closure for said opening in said second end wall and for said outlet opening of said second blower casing, electrically-actuated means connected in an electric circuit for moving each of said closures in and out of closing position, conveyor means for moving stuffing material to said inlet opening of said chamber, a second motor, said conveyor means operatively connected to said second motor, said second motor connected in the circuit of said closure-moving means, and a switch in the circuit of said closure-moving means and said second motor for simultaneously activating and deactivating said motor and said closure-moving means.

2. The apparatus of claim 1, wherein said means operatively interconnecting said second shaft with said motor comprises means operatively interconnecting said second shaft with said first shaft.

3. The apparatus of claim 1, wherein said conveyor means comprises an endless conveyor belt mounted over a pair of rollers, one of said rollers being operatively connected to said second motor.

4. The apparatus of claim 1, wherein said second motor is of variable speed and means are provided for varying the speed of said motor.

5. The apparatus of claim 1, wherein said conveyor means is disposed in a second chamber, said second chamber having an inlet opening and said conveyor comprising an endless belt mounted over a pair of spaced rollers, one of said rollers operatively connected with said second motor.

6. The apparatus of claim 5, wherein said second chamber comprises top, front, rear, and end walls, and a baffle wall is dependently supported within said second chamber parallel to said first end wall to a point adjacent said endless belt, and dividing said second chamber into an inner and an outer compartment, and wherein beaters are rotatably mounted in said inner compartment and wherein a third motor is provided, said beaters operatively connected to said third motor.

7. The apparatus of claim 1, wherein said closure means each comprises a plate having an opening therein and means guiding said plate for movement into and out of register with the opening to be closed thereby, and means operatively connecting each of said plates to said electrically-actuated means.

8. The apparatus of claim 7, wherein said electrically-actuated means comprises an air cylinder having a piston reciprocable therewithin and extending therefrom, said piston connected to said plate, an air valve connected to a source of compressed air and to said air cylinder, and a solenoid actuating said air valve, said solenoid connected in said electric circuit.

9. Stuffing apparatus of the character described, comprising a housing including top, front, rear and end walls, parallel partitions in said housing dividing the same into a plurality of chambers, including a supply chamber at one end thereof and a material-separating chamber adjacent said supply chamber, an opening formed in the lower portion of the partition separating said two chambers, a material conveyor at the bottom of said supply chamber adjacent said opening, a motor connected in an electric circuit, means operatively connecting said conveyor to said motor, beaters rotatably mounted within said supply chamber over said conveyor, a second electric motor, means operatively connecting said beaters to said second electric motor, a blower casing mounted on said partition, within said second-named chamber over said opening, said blower casing having an outlet opening at the top thereof, a blower fan rotatably mounted within said blower casing in front of said opening, a third electric motor, means operatively connecting said blower fan with said third electric motor, beaters within said second-named chamber, means rotatably mounting said beaters, means operatively connecting said beater-mounting means with said third motor, an outlet opening from said second-named chamber formed in the other of said partitions, a second blower casing mounted on the exterior of said second partition over said last-named outlet opening, a blower fan rotatably supported within said second blower casing opposite said last-named outlet opening, means operatively connecting said second blower fan with said third motor, an opening in said front wall opposite an upper portion of said second blower casing, conduit means on said second blower casing connecting with said front wall outlet opening, a closure for each of said outlet openings, electrically-actuated means connected to said closures for moving them in and out of closing position, said electrically-actuated means connected in the electric circuit of said first motor, said motors connected in a common circuit, said common circuit having a main switch, a second switch for opening and closing the circuit through said second motor, and a third switch for opening and closing the circuit through said electric-actuating means and said first motor.

10. The apparatus of claim 9, wherein said first motor is a variable speed motor, and manually-operative means are provided for varying the speed of said first motor.

11. The apparatus of claim 9, wherein said third switch is a normally open pedally-operated switch.

References Cited in the file of this patent
UNITED STATES PATENTS

| | | |
|---|---|---|
| 1,666,549 | Baker | Apr. 17, 1928 |
| 1,715,573 | Scobey | June 4, 1929 |
| 1,805,117 | Van Rensselaer et al. | May 12, 1931 |
| 2,790,493 | Wenzelberger | Apr. 30, 1957 |